US011057195B2

(12) United States Patent
Tschache et al.

(10) Patent No.: US 11,057,195 B2
(45) Date of Patent: Jul. 6, 2021

(54) METHOD AND SYSTEM FOR PROVIDING SECURITY FOR THE FIRST TIME A MOBILE DEVICE MAKES CONTACT WITH A DEVICE

(71) Applicant: VOLKSWAGEN AKTIENGESELLSCHAFT, Wolfsburg (DE)

(72) Inventors: Alexander Tschache, Wolfsburg (DE); Timo Winkelvos, Braunschweig (DE); Bastian Bartels, Wolfsburg (DE)

(73) Assignee: Volkswagen Aktiengesellschaft

( * ) Notice: Subject to any disclaimer, the term of this patent is extended or adjusted under 35 U.S.C. 154(b) by 76 days.

(21) Appl. No.: 15/767,664

(22) PCT Filed: Sep. 14, 2016

(86) PCT No.: PCT/EP2016/071713
§ 371 (c)(1),
(2) Date: Apr. 12, 2018

(87) PCT Pub. No.: WO2017/063810
PCT Pub. Date: Apr. 20, 2017

(65) Prior Publication Data
US 2018/0287787 A1    Oct. 4, 2018

(30) Foreign Application Priority Data
Oct. 16, 2015    (DE) .................... 10 2015 220 228.3

(51) Int. Cl.
*H04L 9/08*    (2006.01)
*H04L 29/06*   (2006.01)
(Continued)

(52) U.S. Cl.
CPC ............ *H04L 9/0841* (2013.01); *H04L 9/006* (2013.01); *H04L 9/0844* (2013.01);
(Continued)

(58) Field of Classification Search
CPC . H04L 9/0844; H04L 9/0841; H04L 63/0853; H04L 63/0823; H04L 9/3242; H04L 63/0869
See application file for complete search history.

(56) References Cited

U.S. PATENT DOCUMENTS 8,831,224 B2    9/2014  Bai et al.
9,571,284 B2    2/2017  Leboeuf et al.
(Continued)

FOREIGN PATENT DOCUMENTS

CN    102664739 A    9/2012
CN    103686713 A    3/2014
(Continued)

OTHER PUBLICATIONS

IP.com Search Query; Apr. 13, 2020 (Year: 2020).*
(Continued)

*Primary Examiner* — Samson B Lemma
*Assistant Examiner* — Blake I Narramore
(74) *Attorney, Agent, or Firm* — Barnes & Thornburg LLP (57) ABSTRACT

A method providing security the first time a mobile device makes contact with a device including a trusted entity introducing asymmetric key into a mobile device, performing a key exchange method on contact-making resulting in a shared key in the mobile device and in the device, generating a first signature with the symmetric key using the shared key in the mobile device, generating a second signature with the symmetric key using the shared key in the device, transmitting the first signature to the device and the second signature to the mobile device, authenticating the device by cryptographic verification of the second signature with the symmetric key in the mobile device, authenticating the mobile device by cryptographic verification of the first
(Continued)

signature with the symmetric key in the device, and continuing contact-making in the event of mutual successful authentication or termination of contact-making if at least one authentication has failed.

13 Claims, 3 Drawing Sheets

(51) Int. Cl.
    *H04W 12/041*     (2021.01)
    *H04W 12/0431*     (2021.01)
    *H04L 9/00*     (2006.01)
    *H04L 9/32*     (2006.01)
    *H04W 4/80*     (2018.01)

(52) U.S. Cl.
CPC ........ *H04L 9/3242* (2013.01); *H04L 63/0823* (2013.01); *H04L 63/0853* (2013.01); *H04L 63/0869* (2013.01); *H04W 12/041* (2021.01); *H04W 12/0431* (2021.01); *H04L 2209/80* (2013.01); *H04L 2209/84* (2013.01); *H04W 4/80* (2018.02)

(56) References Cited

U.S. PATENT DOCUMENTS

| | | | |
|---|---|---|---|
| 9,590,809 B2 | 3/2017 | Hueger et al. | |
| 2007/0021843 A1* | 1/2007 | Neill | G06F 21/72 |
| | | | 700/1 |
| 2010/0111307 A1 | 5/2010 | Hu et al. | |
| 2010/0325435 A1 | 12/2010 | Park et al. | |
| 2012/0129493 A1* | 5/2012 | Vasudevan | H04W 12/0023 |
| | | | 455/411 |
| 2012/0254960 A1* | 10/2012 | Lortz | H04L 63/104 |
| | | | 726/7 |
| 2013/0225086 A1 | 8/2013 | Hsu et al. | |
| 2014/0169634 A1* | 6/2014 | Prakash | G06K 9/6201 |
| | | | 382/105 |
| 2014/0270172 A1* | 9/2014 | Peirce | H04L 9/0819 |
| | | | 380/270 |
| 2015/0143125 A1* | 5/2015 | Nix | H04W 4/70 |
| | | | 713/171 |
| 2015/0281362 A1* | 10/2015 | Shanmugam | H04L 67/12 |
| | | | 709/217 |
| 2015/0372825 A1* | 12/2015 | Park | H04L 9/3247 |
| | | | 713/156 |
| 2016/0191494 A1* | 6/2016 | Claes | H04L 63/0861 |
| | | | 713/159 |
| 2016/0344747 A1* | 11/2016 | Link, II | H04W 12/06 |
| 2017/0103228 A1* | 4/2017 | Yavuz | H04L 9/083 |
| 2017/0195339 A1* | 7/2017 | Brown | G06F 21/34 |
| 2017/0347266 A1* | 11/2017 | Petel | H04L 9/3271 |

FOREIGN PATENT DOCUMENTS

| | | |
|---|---|---|
| CN | 103687744 A | 3/2014 |
| CN | 104393999 A | 3/2015 |
| CN | 104917745 A | 9/2015 |
| DE | 19811833 A1 | 9/1999 |
| DE | 102009042141 A1 | 7/2010 |
| DE | 102013225742 A1 | 6/2014 |
| JP | 2015093556 A | 5/2015 |
| KR | 20050000481 A | 1/2005 |

OTHER PUBLICATIONS

Office Action for Korean Patent Application No. 10-2018-7010983; dated May 21, 2019.

Diallo et al.; Enhancement of Bluetooth Security Authentication Using Hash-Based Message Authentication Code (HMAC) Algorithm; Proc. of the International Conference on Computer & Communication Engineering; Sep. 25, 2014.

Euchner; HMAC-Authenticated Diffie-Hellman for Multimedia Internet KEYing (MIKEY); Joint Collaborative Team on Video Coding of ISO/IEC; Mar. 16-23, 2011; Geneva.

Han et al.; MVSec: Secure and Easy-to-Use Pairing of Mobile Devices with Vehicles; Security and Privacy in Wireless & Mobile Networks; ACM; Jul. 23, 2014.

Search Report for German Patent Application No. 10 2015 220 228.3; dated Jul. 27, 2016.

Search Report for International Patent Application No. PCT/EP2016/071713; dated Nov. 4, 2016.

Office Action for Chinese Patent Application No. 201680060115.7; dated Jun. 23, 2020.

\* cited by examiner

METHOD AND SYSTEM FOR PROVIDING SECURITY FOR THE FIRST TIME A MOBILE DEVICE MAKES CONTACT WITH A DEVICE

PRIORITY CLAIM

This patent application is a U.S. National Phase of International Patent Application No. PCT/EP2016/071713, filed 14 Sep. 2016, which claims priority to German Patent Application No. 10 2015 220 228.3, filed 16 Oct. 2015, the disclosures of which are incorporated herein by reference in their entireties.

SUMMARY

Illustrative embodiments relate to a method and a system for providing security for the first time a mobile device makes contact with a device.

Illustrative embodiments relate to the challenge of coupling mobile devices via WLAN or BLUETOOTH® (Low Energy, LE) with other devices, such as transportation vehicles, without direct access to the transportation vehicle and without being able to prepare the transportation vehicle in advance for the new subscriber, for example, over the Internet.

BRIEF DESCRIPTION OF THE DRAWINGS

Exemplary embodiments will be explained hereafter by reference to the associated drawings. Shown are.

DETAILED DESCRIPTION

Disclosed embodiments relate to the challenge of coupling mobile devices via WLAN or BLUETOOTH® (Low Energy, LE) with other devices, such as transportation vehicles, without direct access to the transportation vehicle and without being able to prepare the transportation vehicle in advance for the new subscriber, for example, over the Internet.

BLUETOOTH® offers a variety of pairing mechanisms, but these are not secure unless they include so-called out-of-band confirmation, i.e., the human interaction channel for authenticating the connection. Without this channel, man-in-the-middle attacks are possible, and it is then not certain with whom or to what the car or the mobile device has established a connection. The same applies to a wireless connection. Without access to the transportation vehicle and the facility for displaying a code or a PIN there, an out-of-band confirmation is not possible.

Such situations can arise, for example, in car-sharing systems. Known car-sharing systems are not integrated with the actual transportation vehicle systems, such as the immobilizer, and solve the problem by retrofit solutions, which is expensive.

DE 10 2009 042 141 A1 discloses a system with a wireless communication device, a transportation vehicle and a server that provides a key. It is a requirement that both the communication device and the transportation vehicle have a connection to the server.

DE 10 2013 225 742 A1 discloses a method for determining whether a user of an electronic device is an authorized user of a transportation vehicle. To do this, a central server is used to detect whether the user can perform a transportation vehicle operation. If this is the case, the user is allowed to perform further requests with respect to the transportation vehicle.

US 2010/0111307 A1 discloses an in-band signaling system in an optical transmission network for the determination and control of session keys.

DE 198 11 833 A1 discloses a key exchange protocol using the Diffie-Hellman protocol with an end-to-end authentication using a combination of the Diffie-Hellman method and a public key encryption method, and not a combination of the classic Diffie-Hellman protocol with signature protocols.

Disclosed embodiments improve the first access to a device by a mobile device.

A method is proposed, which is based on a symmetric key in the mobile device and in the device.

The disclosed method for providing security the first time a mobile device makes contact with a device, wherein the device is provided with a symmetric key introduced by a trusted entity, comprises:

introduction of the symmetric key into the mobile device by the trusted entity;

performance of a key exchange procedure on contact being made with the result of a shared key in the mobile device and in the device;

generation of a first signature with the symmetric key using the shared key in the mobile device;

generation of a second signature with the symmetric key using the shared key in the device;

transmission of the first signature to the device and of the second signature to the mobile device;

authentication of the device by cryptographic verification of the second signature with the symmetric key in the mobile device;

authentication of the mobile device by cryptographic verification of the first signature with the symmetric key in the device; and continuation of the contact-making process in the event of mutual successful authentication or termination of the contact-making process if at least one authentication has failed.

In the disclosed method, other subscriber devices or mobile devices that have not previously been paired with the device, for example, a transportation vehicle, can be authorized for secure use as keys without any access being provided to the second device. Thus, any desired devices, such as smartphones, can then be used as a digital key for the device, for example, a transportation vehicle. The disclosed method is suitable for a car-sharing system. Additionally, due to the structure of the method, man-in-the-middle attacks can be completely prevented, which increases security. Also, no connection to a central server or the Internet is needed, since the necessary cryptographic material is already present in the transportation vehicle. Only the connection to the mobile device is necessary. The disclosed method provides a cryptographically secure connection of the coupling system of the transmission technology to additional authentication mechanisms. The cryptographic material in the device or transportation vehicle in connection with the proposed method replaces a PIN confirmation of a pairing procedure. Therefore no actual access to the device or transportation vehicle is necessary, which is usually the case to enter or confirm a PIN or a key. Also, already existing and externally specified procedures can be extended without the need to modify them.

The trusted entity can be, for example, a secure server of a transportation vehicle manufacturer or a service provider, such as a car-sharing service. The trusted entity can be part of a public key infrastructure PKI, such as a certification authority. The operation of introducing the keys into the mobile device can also take place after executing the key exchange procedure. For the key exchange procedure, common methods such as Diffie-Hellman can be used.

It can be assumed that the transmission technology has a secure key exchange procedure (KEP), but one which is not secure against man-in-the-middle attacks, for example, Diffie-Hellman. Usually, the key exchange procedure is prescribed by an external agency, for example, a BLUETOOTH® pairing process. The disclosed method then relies on the specified key exchange procedure, or extends it.

In other words, the disclosed method can proceed as follows. The key exchange method is used upon initial contact for the purpose of pairing the devices. For this purpose, public keys are used in each case and a shared key is obtained for the subsequent communication. To then authenticate this key on both sides, i.e., to ensure that the genuine transportation vehicle and the genuine mobile device really have carried out the key exchange procedure with each other directly, a unique characteristic of this implementation of the key exchange procedure is signed by both subscribers and authenticated by the respective other subscriber. This operation has taken place up to now, for example, by the confirmation of a checksum of the user indicated on both devices.

For this purpose, for example, a digital fingerprint is performed on the characteristic by applying a cryptographically hard one-way function. This has the property that the image of the function, i.e., the digital fingerprint, cannot be used to deduce the original image and the image always remains constant given the same input. The fingerprint must then be signed by both subscribers. This signature is carried out on the basis of asymmetric keys, for which the following applies: the device has produced and certified its own private keys itself, since it is part of the trust chain of a PKI and the necessary keys and certificates for it have already been introduced during the production process. The mobile device has previously obtained a certificate via an interface to the trust infrastructure (PKI) of the device manufacturer to authenticate the device, and a certificate of its own key for its own authentication vis-à-vis the device. The recipient can now authenticate the other subscriber by the signatures that were sent being cryptographically verified by the fingerprint and the certificates of the keys sent along with them also being cryptographically verified, allowing the chain of trust to be authentically established in each case. Then, on the basis of the calculated shared key the subscribers will be able to communicate with each other authentically and confidentially.

A method for providing security for a first contact by a mobile device with a device, wherein the device is provided with a signed public device key, a corresponding private device key and a public key of a certification authority, comprises:

introduction of a signed public mobile device key and a corresponding private mobile device key and the public key of the certification authority into the mobile device;

performance of a key exchange procedure on contact being made with the result of a shared key in the mobile device and in the device;

generation of a first signature with the private mobile device key using the shared key in the mobile device;

generation of a second signature with the private mobile device key using the shared key in the device;

transmission of the first signature and the signed public mobile device key to the device and of the second signature and the signed public device key to the mobile device;

authentication of the device by cryptographic verification of the second signature with the signed public device key and the public key of the certification authority in the mobile device;

authentication of the mobile device by cryptographic verification of the first signature with the signed public mobile device key and the public key of the certification authority in the device; and continuation of the contact-making process in the event of mutual successful authentication or termination of the contact-making process if at least one authentication has failed.

The same benefits and modifications apply as previously described. The introduction of the signed public mobile device key and the corresponding private mobile device key also comprises the fact that the actual generation of these keys is performed in the mobile device, the public mobile device key is sent to the certification authority or a backend, where it is signed and then the signed public mobile device key is introduced into the mobile device.

In contrast to the previously described method, which is based on a symmetric key in the mobile device and in the device, this method is based on asymmetric keys. Depending on the available or desired public key infrastructure PKI, one or the other method can be used.

It can be provided that the device generates and certifies the signed public device key and the corresponding private device key itself, and that the necessary keys and certificates are introduced during the manufacture of the device. This assumes that a certification authority is available in the transportation vehicle, which can simplify the method, for example, by reducing the transmission of cryptographic material, and render it safer. Alternatively, the cryptographic material is introduced into the transportation vehicle as part of a PKI, optionally, during the manufacture of the device.

It can be further provided that the signed public device key, the corresponding private device key and the public key of a certification authority or the symmetric key are introduced into the device during the production of the device. This increases security, since the production of the device takes place within a secure environment.

It may also be provided that the symmetric key or the signed public mobile device key and the corresponding private mobile device key and the public key of a certification authority are introduced into the mobile device before contact is made. This method of introduction allows a complete preparation of the method, which can then proceed without a connection to a server or a PKI authority.

The keys can be introduced by the installation of a program in the mobile device. This introduction, for example, as an app, is simple and secure to carry out and is also accepted by potential users of the device.

The key exchange procedure can be based on a Diffie-Hellman method. For example, a coupling or pairing process can be performed via an Elliptic Curve Diffie-Hellman key agreement protocol in the "Secure Simple Pairing—Numerical comparison" pairing mode. Such procedures require only a reasonable amount of hardware.

The exchange of the signatures can be used to perform a confirmation in the key exchange procedure. This enables a typically required confirmation of a code in the key exchange procedure to be replaced by the exchange of the signatures. While in common pairing processes a code such as a PIN or a long-term key (LTK) must be confirmed and compared, these tasks are executed by the method, which runs automatically. This increases the level of security by the exclusion of operator errors and increases its convenience.

It can be provided that other systems than those required to implement the method are only activated in the device after mutual authentication has been completed. This prevents an energy supply, such as a transportation vehicle battery, being drained, which prevents unsafe states of the device occurring.

The disclosed system for providing security for a first contact by a mobile device with a device provides that the mobile device and the device are configured a method as described above. The same benefits and modifications apply as previously described.

The device can be a transportation vehicle and/or the mobile device can be a smartphone. This is a commonly occurring combination, for example, for car-sharing services that can benefit from the system.

It can be provided that the mobile device and the device each have a transmit/receive unit for shared communication according to the BLUETOOTH® low energy standard. This standard is in widespread use both in mobile devices as well as in devices such as transportation vehicles, and allows a simple implementation.

It can be further provided that the device has a transmit/receive unit and a computer unit connected thereto, which is configured for implementing the previously described method, and that other systems of the device can only be activated after successful authentication by control commands of the computer unit. The associated computer unit can be, for example, a communications control device of a transportation vehicle. It can prevent a deliberate draining of a transportation vehicle battery.

Further disclosed embodiments are derived from the remaining features, referred to in the dependent claims.

The various disclosed embodiments cited in this application, unless stated otherwise for each case, can be combined with one another.

Figure 1:
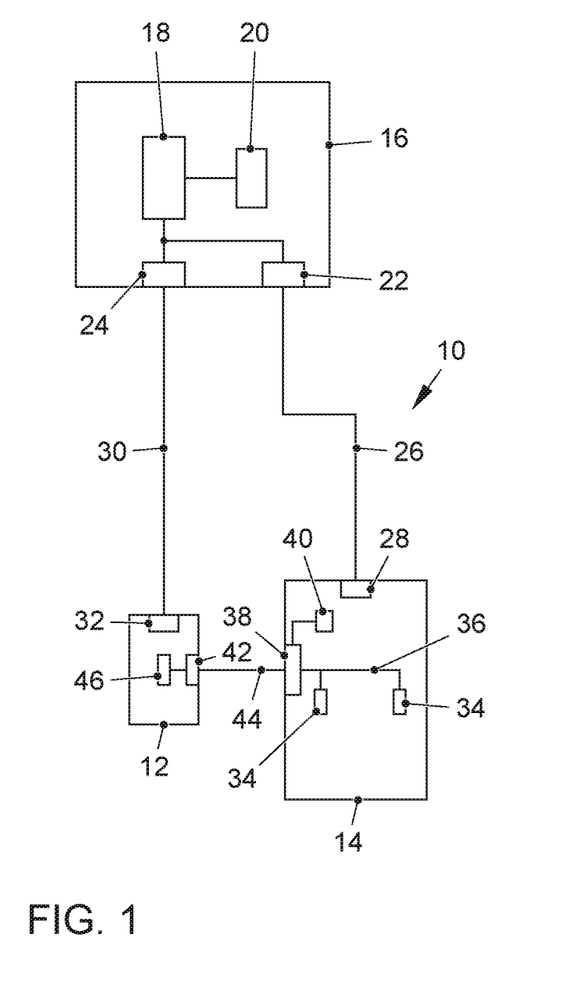
FIG. 1 shows a schematic representation of a system for providing security for the first time a mobile device makes contact with a device.

FIG. 1 shows an exemplary embodiment of a system 10 for providing security for the first time a mobile device 12 makes contact with a device, such as a transportation vehicle 14. For the system 10 the example used here is that of a transportation vehicle manufacturer. In a backend 16 of the transportation vehicle manufacturer, a certification authority 18 and a database 20 are arranged. The backend 16, the certification authority 18 and the database 20 are shown as dedicated units. In the database 20 it can be provided that information about the cryptographic material used, among other things, is assigned to the transportation vehicles 14.

It is possible to combine all or a plurality of the elements, for example, in a server. The certification authority 18 can be implemented completely or partially as software. The certification authority 18 belongs to a Public Key Infrastructure (PKI). The public key infrastructure comprises the backend 16 of the transportation vehicle manufacturer and transportation vehicles 14 of the manufacturer, one of which is shown as an example.

The mobile device 12 can be a mobile computer, such as a laptop or tablet or a smartphone, a smart watch, a pair of data glasses or another wearable computer. The transportation vehicle 14 can be, for example, a car, lorry, bus or motorcycle or a rail, water-borne or airborne transportation vehicle.

The backend 16 has a first interface 24 for communication with the transportation vehicle 14 and a second interface 22 for communication with the mobile device 12. Via the first interface 22, the backend 16 or the certification authority 18 communicates with the transportation vehicle 14. This is implemented via a connection 26, for example, a WLAN or mobile wireless network, or else via a cable or Ethernet. Optionally, the connection 26 is activated in a secure environment of the transportation vehicle manufacturer during the manufacture of the transportation vehicle 14, since it is via this connection 26 that cryptographic material that must be kept secret, such as a symmetric key or a private key, is introduced into the transportation vehicle 14. The transportation vehicle 14 has a corresponding, compatible interface 28 for this purpose.

Via the second interface 24, the backend 16 or the certification authority 18 communicates with the mobile device 12. This is implemented via a connection 30, for example, a WLAN or mobile wireless network, or else via a cable or Ethernet.

This connection 30 is typically openly accessible as a mobile wireless network. To this end, the mobile device 12 contains a corresponding, compatible interface 32.

In the transportation vehicle 14 a plurality of control devices 34 or other computing devices are arranged on one or more bus systems 36, for example, based on the CAN standard. The transportation vehicle also comprises a transmit/receive unit 38 and a corresponding control unit 40. The transmit/receive unit 38 may work wirelessly, based, for example, on the BLUETOOTH® LE (Low Energy) or WLAN standard. The control device 40 is configured to implement pairing processes via the transmit/receive unit 38 for establishing a connection to an external device, such as the mobile device 12.

The mobile device 12 in turn comprises a corresponding transmit/receive unit 42, via which a connection 44 can be established to the transmit/receive unit 38 of the transportation vehicle 14. A microprocessor 46 of the mobile device 12 is configured to implement pairing processes via the transmit/receive unit 42 for establishing a connection to an external device, such as the transportation vehicle 14. For this, a program or an app can be used, which has been downloaded from the backend 16.

By reference to FIG. 2, a first exemplary embodiment will now be described of the provision of security for the first time a mobile device 12 makes contact with a device 14. The device 14 can be, for example, the transportation vehicle 14 or the control unit 40 from FIG. 1.

As part of an advance preparation stage, in other words before any initial contact between the mobile device 12 and the device 14, both subscribers are equipped with a shared, in other words an identical, symmetric key 48. The symmetric keys 48 are issued by a trusted entity, such as a backend 16 of the manufacturer. The device 14 already obtains the symmetric key 48 or data for deriving the symmetric key 48 at the time of its production, while the mobile device 12 obtains the symmetric key 48 on the installation of a software or registration of a service, such as a car-sharing service.

When contact is made between the mobile device 12 and the device 14, a key exchange procedure 49 is carried out. As an example, a Diffie-Hellman procedure is presented. The mobile device 12 contains a private key 50a and a public key 52a, while the device 14 contains a private key 50b and a public key 52b. The mobile device 12 and the device 14 then exchange their public keys 52a and 52b.

In a key generation operation, the mobile device 12 generates a shared key 56 from its private key 50a and the public key 52b of the device 14. In the same way, the device 14 generates the shared key 56 from its private key 50b and the public key 52a of the mobile device 12. The key exchange procedure 49 ends here.

In the mobile device 12, as part of a signature generation process 58 a first signature 60a is then generated with the symmetric key 48 using the shared key 56. Similarly, in the device 14 as part of a signature generation process 58, a second signature 60b is generated with the symmetric key 48 using the shared key 56.

Then, the first signature 60a is transmitted to the device 14 and the second signature 60b is transmitted to the mobile device 12. This takes place over the same interface or connection over which the key exchange procedure 49 was carried out. This may be, for example, the connection 44 with the interfaces or transmit/receive units 38 and 42 from FIG. 1.

As part of an authentication 62, the device 14 is authenticated by cryptographic verification of the second signature 60b with the symmetric key 48 in the mobile device 12. In the same way, as part of an authentication 62 the mobile device 12 is authenticated by cryptographic verification of the first signature 60a with the symmetric key 48 in the device 14.

In the event of a successful authentication 64, that is, with mutual authentication, the establishment of the contact is continued. For example, in the example of FIG. 1 other systems, such as the bus 36 and/or other control devices 34 of the device 14, are only then activated by control commands of the control device 40.

In the event of an unsuccessful authentication 66, that is to say if at least one authentication 62 has failed, either in the device 14 or in the mobile device 12, the establishment of the contact is aborted.

In the following, a possible everyday example will be described. A transportation vehicle owner or car-sharing service provider would like to issue a digital transportation vehicle key to a customer via a mobile terminal or mobile device. The mobile device 12 of B is BLUETOOTH® Low Energy or else BT Classic or WLAN enabled. Via the backend system 16 a newly-issued digital transportation vehicle key is transported to the mobile device 12 of B. In addition, symmetric or asymmetric key material is distributed to the mobile device 12.

If B is located in radio transmission range of the transportation vehicle 14 with his/her mobile device 12, a pairing process via Elliptic Curve Diffie-Hellman key agreement protocol is automatically initiated in the "Secure Simple Pairing—Numerical comparison" pairing mode. Both the mobile device 12 and the transportation vehicle 14 hereby establish a long-term key (LTK) and then await confirmation of the fingerprint, which is represented as a 6-digit number using the agreed secret, to prevent man-in-the-middle attacks. On both sides this required user interaction is bypassed and confirmed automatically in software. Then, using the already available key material by transmission and subsequent verification this authenticity of the negotiated key material is ensured in a downstream operation of the standardized pairing process. Thus, despite the lack of user interaction, the mutual key authenticity and therefore the resistance against man-in-the-middle attacks is ensured.

On the basis of FIG. 3, a second exemplary embodiment will now be described of the provision of security for the first time a mobile device 12 makes contact with a device 14. The device 14 can be, for example, the transportation vehicle 14 or the control unit 40 from FIG. 1. The method of FIG. 3 is similar to the method of FIG. 2. The main difference is that the method according to FIG. 2 is based on a shared symmetric key 48, while the method according to FIG. 3 is based on asymmetric key material.

As part of an advance preparation stage, in other words before an initial contact is made between the mobile device 12 and the device 14, both subscribers are equipped with asymmetric key material.

The mobile device 12 receives a signed public device key 104a and a corresponding private device key 102a and a public key 100 from a certification authority, for example, from the PKI association of the transportation vehicle manufacturer or from another trustworthy service provider.

The device 14 receives a signed public device key 104b and a corresponding private device key 102b and a public key 100 from a certification authority, for example, from the PKI association of the transportation vehicle manufacturer or other trustworthy service provider.

The device 14 already obtains the key material at the time of production, while the mobile device 12 obtains the key material on the installation of a software or registration of a service, such as a car-sharing service.

Figure 2:
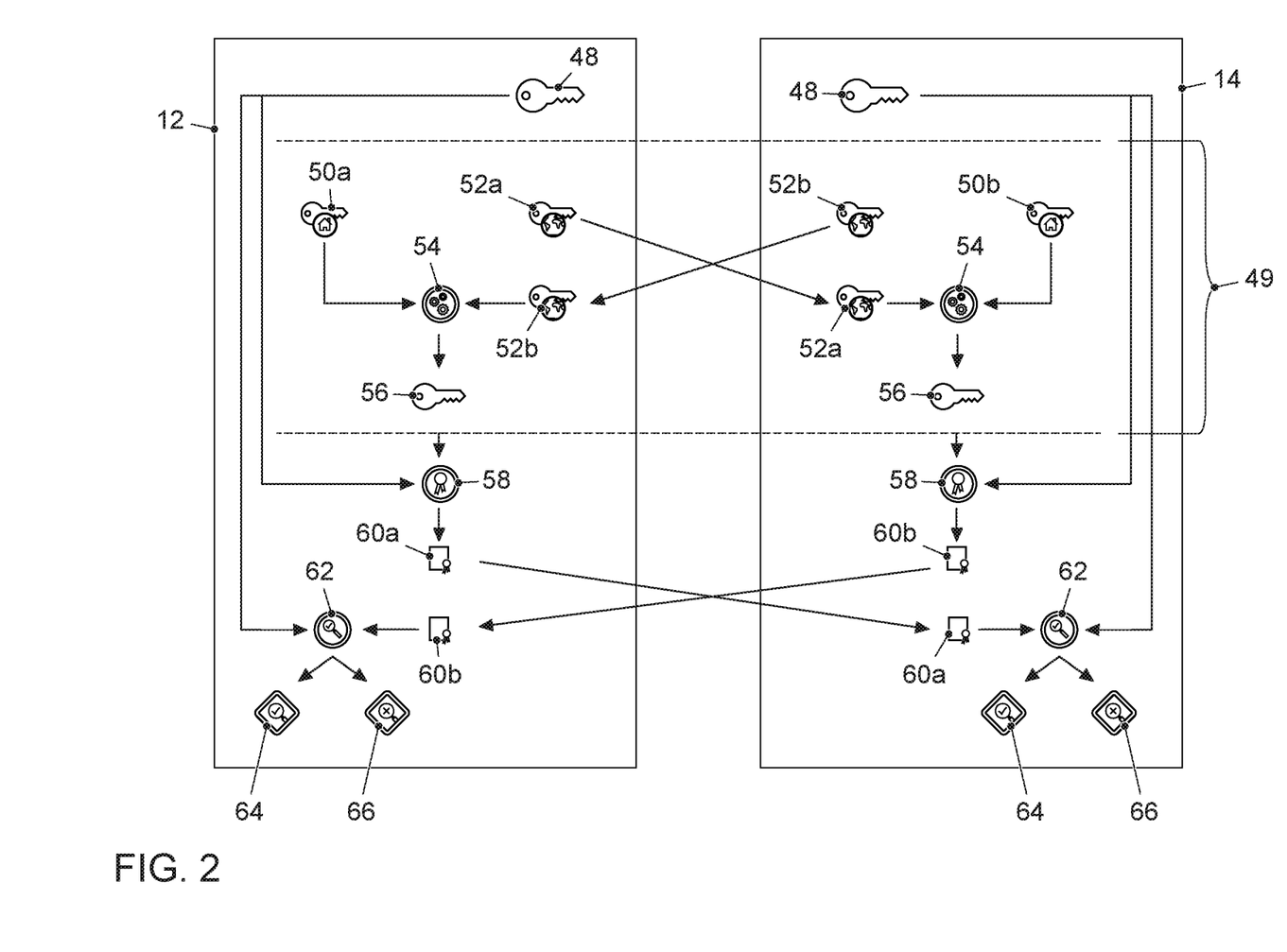
FIG. 2 shows a schematic representation of the provision of security for the first time a mobile device makes contact with a device.
Figure 3:
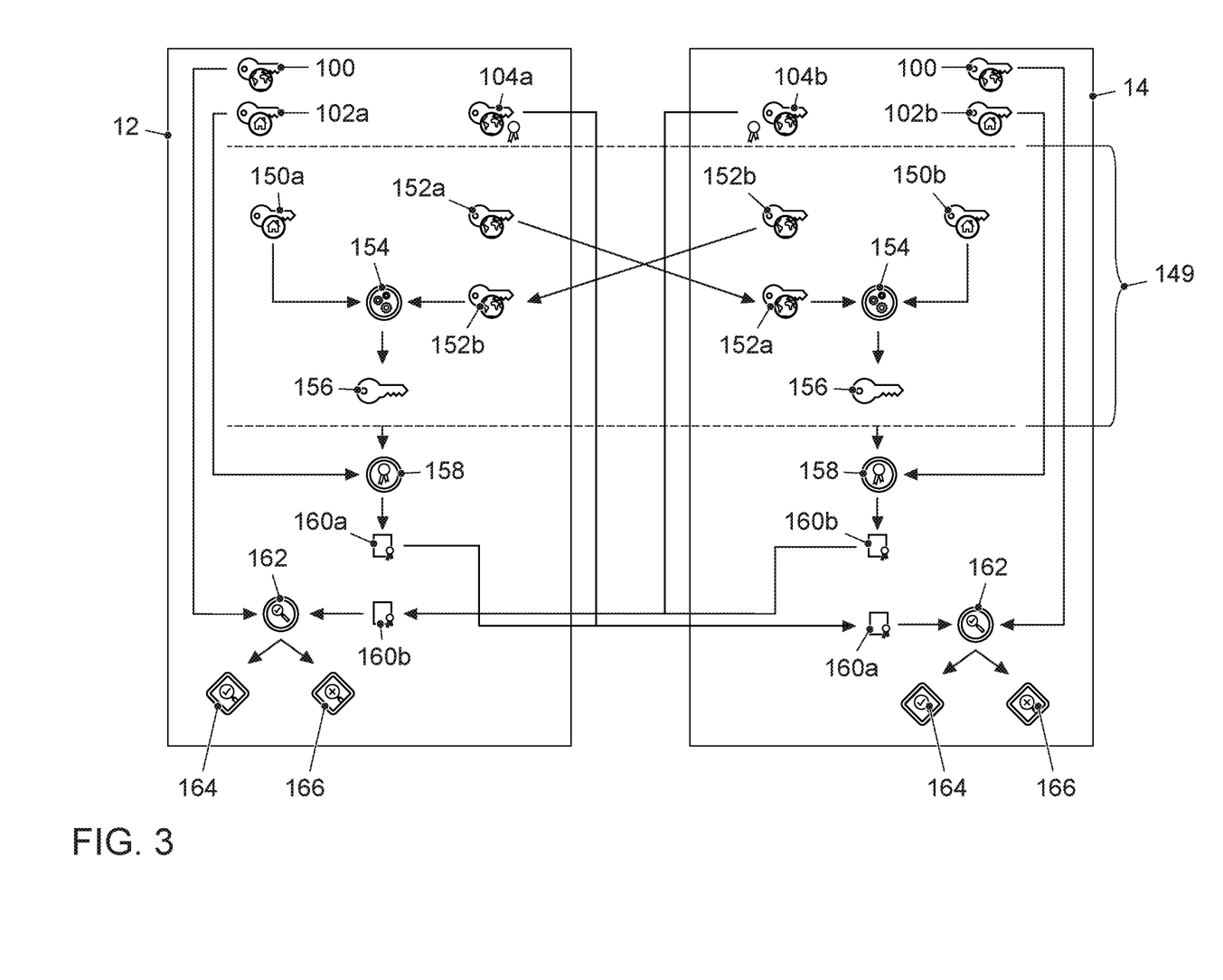
FIG. 3 shows a further schematic representation of the provision of security for the first time a mobile device makes contact with a device.

When contact is made between the mobile device 12 and the device 14, a key exchange procedure 149 is carried out, which can correspond to that of FIG. 2. As an example, a Diffie-Hellman key exchange procedure is presented. The mobile device 12 contains a private key 150a and a public key 152a, while the device 14 contains a private key 150b and a public key 152b. The mobile device 12 and the device 14 then exchange their public keys 152a and 152b.

In a key generation operation 154 the mobile device 12 generates a shared key 156 from its private key 150a and the public key 152b of the device 14. In the same way, the device 14 generates the shared key 156 from its private key 150b and the public key 152a of the mobile device 12. The key exchange procedure 149 ends at this point.

In the mobile device 12, as part of a signature generation process 158 a first signature 160a is then generated with the private mobile device key 102a using the shared key 156. In the same way, as part of a signature generation process 158, a second signature 160b is generated in the device 14 with the private device key 102b using the shared key 156.

Then, the first signature 160a and the signed public mobile device key 104a are transmitted to the device 14 and the second signature 160b and the signed public device key 104b are transmitted to the mobile device 12. This takes place over the same interface or connection over which the key exchange procedure 149 was carried out. This may be, for example, the connection 44 with the interfaces or transmit/receive units 38 and 42 from FIG. 1.

As part of an authentication operation at 162, the device 14 is authenticated by cryptographic verification of the second signature 160b with the signed public device key 104b and with the public key 100 of a certification authority in the mobile device 12. Similarly, as part of an authentication operation at 162, the mobile device 12 is authenticated by cryptographic verification of the first signature 160a with the signed public mobile device key 104a and with the public key 100 of a certification authority in the device 14.

In the event of a successful authentication 164, that is, with mutual authentication, the contact is continued. For example, in the example of FIG. 1 other systems, such as the bus 36 and/or other control devices 34 of the device 14, are only then activated by control commands of the control device 40.

In the event of an unsuccessful authentication 166, that is if at least one authentication 162 has failed, either in the device 14 or in the mobile device 12, the establishment of the contact is aborted.

The proposed method therefore also enables a cryptographically secure connection using a pairing process between subscribers who previously had no contact with each other without access needing to be provided to one of the two subscribers.

LIST OF REFERENCE NUMERALS 10 system
12 mobile device
14 transportation vehicle
16 backend
18 certification authority
20 database
22 interface
24 interface
26 connection
28 interface
30 connection
32 interface
34 control device
36 bus system
38 transmit/receive unit
40 control device
42 transmit/receive unit
44 connection
46 microprocessor
48 symmetric key
50 key exchange procedure
50a private key
50b private key
52a public key
52b public key
54 key generation
56 shared key
58 signature generation
60a first signature
60b second signature
62 authentication
64 successful authentication
66 unsuccessful authentication
100 public key of a certification authority
102a private mobile device key
104a public mobile device key
102b private device key
104b public device key
150a private key
150b private key
152a public key
152b public key
154 key generation
156 shared key
158 signature generation
160a first signature
160b second signature
162 authentication
164 successful authentication
166 unsuccessful authentication

The invention claimed is:

1. A method for providing security for an initial contact made between a mobile device and a transportation vehicle device in a transportation vehicle, wherein the transportation vehicle device has a symmetric key introduced by a trusted entity, the method comprising:
 introducing the symmetric key into the mobile device by the trusted entity by installation of a program in the mobile device prior to initial contact between the mobile device and the transportation device;
 performing a key exchange procedure in response to initial contact being made between the mobile device and the transportation vehicle device, wherein the key exchange procedure is performed directly between the mobile device and the transportation vehicle device, the key exchange procedure resulting in a shared key in the mobile device and in the transportation vehicle device;
 generating a first signature with the symmetric key using the shared key in the mobile device;
 generating a second signature with the symmetric key using the shared key in the transportation vehicle device;
 transmitting the first signature to the transportation vehicle device and the second signature to the mobile device so as to exchange signatures therebetween;
 authenticating the transportation vehicle device by cryptographic verification of the second signature with the symmetric key in the mobile device;
 authenticating the mobile device by cryptographic verification of the first signature with the symmetric key in the transportation vehicle device; and
 continuing the contact-making process only in response to mutual successful authentication,
 wherein, during the key exchange procedure, generation of the first and second signatures and authentication of the transportation vehicle device and the mobile device by cryptographic verification are performed without physical access to the transportation vehicle device inside the transportation vehicle by a user associated with the mobile device.

2. The method of claim 1, wherein the symmetric key is introduced into the transportation vehicle device during production of the transportation vehicle device.

3. The method of claim 1, wherein the key exchange is based on a Diffie-Hellman method.

4. The method of claim 1, wherein the exchange of the signatures is used to perform a confirmation in the key exchange procedure.

5. The method of claim 1, wherein other systems than those required to implement the method are activated in the transportation vehicle device only after mutual authentication has been completed.

6. A system for providing security for an initial contact made between a mobile device and a transportation vehicle device of a transportation vehicle, the transportation vehicle device having a symmetric key introduced by a trusted entity, wherein the system comprises:
 software stored on a non-transitory computer readable medium, which software, when run on a processor facilitates use of the symmetric key for communication between the mobile device and the transportation vehicle device;
 a control device configured to implement pairing processes for establishing a connection between the transportation vehicle device and the mobile device using the symmetric key based on the software that performs operations to facilitate use of the symmetric key for communication between the mobile device and the transportation vehicle device, wherein the system introduces the symmetric key into the mobile device by the trusted entity by installation of a program in the mobile device prior to initial contact between the mobile device and the transportation device, performs a key exchange procedure in response to contact being made, wherein the key exchange procedure is performed directly between the mobile device and the transportation vehicle device, the key exchange procedure resulting in a shared key in the mobile device and in the transportation vehicle device, generates a first signature with the symmetric key using the shared key in the mobile device, generates a second signature with the symmetric key using the shared key in the transportation vehicle device, transmits the first signature to the transportation vehicle device and the second signature to the mobile device so as to exchange signatures therebetween, authenticates the transportation vehicle device by cryptographic verification of the second signature with the symmetric key in the mobile device, authenticates the mobile device by cryptographic verification of the first signature with the symmetric key in the transportation vehicle device, and continues the contact-making process only in response to mutual successful authentication, wherein, during the key exchange procedure, generation of the first and second signatures and authentication of the transportation vehicle device and the mobile device by cryptographic verification are performed without physical access to the transportation vehicle device inside the transportation vehicle by a user associated with the mobile device.

7. The system of claim 6, wherein the mobile device is a smartphone.

8. The system of claim 6, wherein the mobile device and the transportation vehicle device each have a transceiver for shared communication.

9. The system of claim 6, wherein the transportation vehicle device comprises a transceiver and a computer unit connected thereto, wherein the computer unit is configured to carry out facilitation of use of the symmetric key for communication between the mobile device and the transportation vehicle device, and wherein other systems of the transportation vehicle device are activated only after successful authentication by control commands of the computer unit.

10. The system of claim 6, wherein the symmetric key is introduced into the transportation vehicle device during production of the transportation vehicle device.

11. The system of claim 6, wherein the key exchange is based on a Diffie-Hellman method.

12. The system of claim 6, wherein the exchange of the signatures is used to perform a confirmation in the key exchange procedure.

13. The system of claim 6, wherein other systems than those required to implement the method activated in the transportation vehicle device only after mutual authentication has been completed.

* * * * *